United States Patent Office 3,606,498
Patented Sept. 20, 1971

3,606,498
BEARINGS
John M. Ohno, Plymouth, Mich., assignor to
The Bendix Corporation
Continuation of application Ser. No. 582,818, Sept. 29, 1966. This application Mar. 3, 1969, Ser. No. 808,363
Int. Cl. F16c 25/02, 33/24
U.S. Cl. 308—3R                     12 Claims

ABSTRACT OF THE DISCLOSURE

Bearings and the like for high vacuum, high temperature environments having at least one bearing surface of zirconium, ruthenium or uranium.

---

Figure 1A:
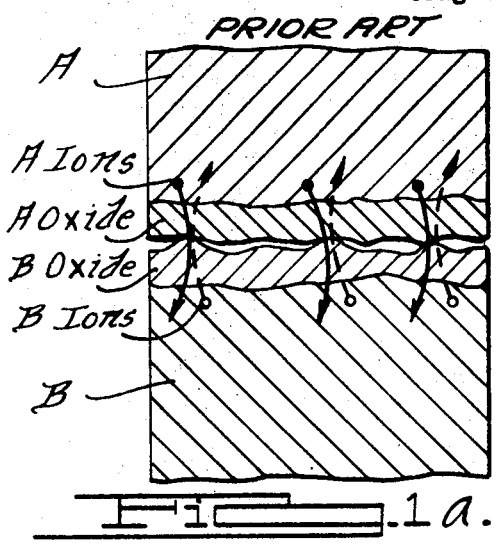

This application is a continuation of application Ser. No. 582,818 filed Sept. 29, 1966, now abandoned.

This invention relates generally to new combinations of mating surface materials which will prevent adherence of mating surfaces in high temperature-high vacuum environments such as those occurring in space and high vacuum equipment and, more particularly, this invention relates to the construction of bearings and mating surfaces utilizing zirconium, uranium, ruthenium and their alloys in at least one of the surfaces to prevent interface adhesion.

In a normal earth environment, interface adhesion is prevented through the use of lubricants. The lubricants serve to separate the two mating surfaces to a minute degree thereby preventing adhesion at their interface. Presently known lubricants have been found to be unsatisfactory in a high temperature-high vacuum environments. Fluid lubricants are unsatisfactory since they will evaporate under these conditions. Solid lamellar lubricants such as graphite and molybdenum disulfide are also unsatisfactory since these lubricants depend, for their lubricating qualities, upon the cushioning effect of oxygen atoms in their structure which will be extracted in ultrahigh vacuum conditions. Because a satisfactory lubricant is not available, metal-to-metal contact bearings have become necessary. Metal-to-metal contact bearings have a tendency to gall, that is, to transfer the material of one mating surface to the other mating surface causing a buildup on that surface which may result in a seizure of the bearing. This tendency to gall is normally overcome by coating the mating surfaces with a material that possesses a low shear strength resulting in a surface which tends to yield and deform rather than break away and adhere to the mating surface. The most common low shear strength surface materials used in metal-to-metal contact bearings are silver and gold. However, these two metals have distinct limitations in their use as a bearing material in an ultrahigh vacuum. If the movement of the two bearing surfaces relative to each other is stopped temporarily, silver and gold will have a tendency to adhere to the mating surfaces. This adherence is caused by the diffusion of the ions of each bearing surface into its mating surface thereby forming an alloy which cements the two surfaces together. This migration of ions by diffusion is commonly known as "cold welding" or, by a better term, "solid state bonding." If the two bearing surfaces are moved relative to each other after solid state bonding between the surfaces has occurred, the bond will break causing a surface roughness which promotes galling and may lead to an eventual seizure of the bearing. Solid state bonding between bearing surfaces is not a serious problem in a normal earth environment since the metal ions reaching the surface of the bearing material react with oxygen from the atmosphere to form oxide, rather than diffuse into a mating material to form an alloy with that material. However, in an ultrahigh vacuum, there is no supply of oxygen, therefore, the metal ions are not oxidized and are available for diffusion into a mating surface.

At times, bearings used in space apparatus must operate at elevated temperatures. Silver and gold are undesirable for such applications because the surface metal tends to vaporize at elevated temperatures, thereby eventually exposing the substrate material. The vaporization of a bearing surface material is particularly detrimental when the bearing is located near electrical apparatus. Generally, the bearing material will be at a higher temperature than the surroundings because of the friction heat generated by the moving bearing surfaces. The vaporized bearing material will condense and coat the cooler surrounding surfaces. If the material condenses on an insulator, it can cause electrical conduction along its surface.

Gold has a further limitation as a bearing material for heavy loads since it is soft and deforms easily, thus exposing the base material. Furthermore, the hardness of gold cannot be improved by work hardening.

This invention also has application to mating bearing surfaces which must be in fixed contact for a period of time without interface adhesion. As an example, instrument capsules, firmly attached to a propelling vehicle for long periods of time, must be capable of separation from the propelling vehicle at a precise moment. Also, electrical contacts in space apparatus are required to be closed for long periods of time and yet must be able to open freely.

The spread of technology into fields requiring the operation of apparatus in high temperature-high vacuum environments created a pressing need for combinations of mating surfaces which do not adhere. The object of this invention is to provide new combinations of mating surfaces capable of operation in high temperature and high vacuum environments without adhesion between the surfaces and without vaporization of the surface material.

Figure 1B:
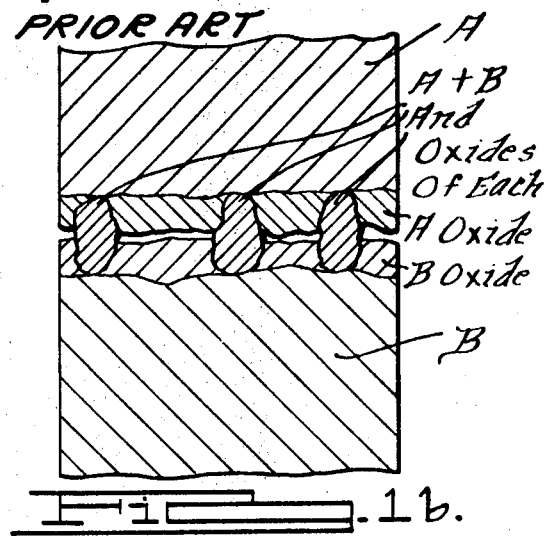

In the drawings:

In FIGS. 1a and 1b, greatly enlarged diagrammatic representations of two mating surfaces exhibiting high rates of diffusion are shown. In FIGS. 2–5, several embodiments of the invention are illustrated.

In FIG. 1a, two materials, A and B, are shown with their oxide layers in contact. Since this is a greatly enlarged view, the surfaces are shown to have an irregular outline. If the two materials exhibit high rates of diffusivity such as gold and silver, either the ions of A will diffuse through the two oxide layers and into material B as shown by the solid arrows or, depending on the nature of the ions of A and B, the ions of B will diffuse through the oxide layers and into material A as shown by the dotted arrows. The net result of this migration of ions is an alloying condition shown in FIG. 1b as A and B which cements the surface together. The migration of ions described will occur at a more rapid rate if there is no oxide layer.

Figure 2:
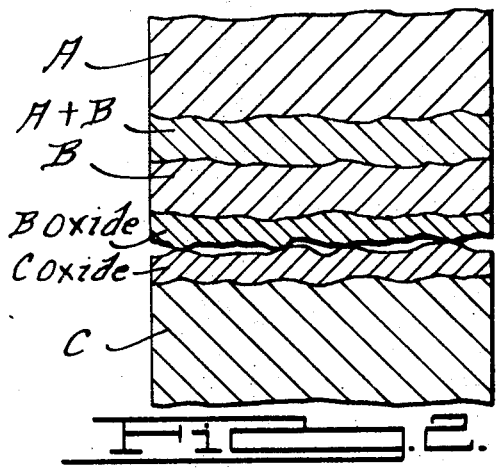

In FIG. 2, one embodiment of the invention is shown. The substrate material A may be titanium, a common structural material used in space apparatus. The surface material B may be zirconium matched to the other surface material C, aluminum, another common structural material. Since zirconium diffuses readily into titanium, an area of diffusion is shown as section A+B. The bond between zirconium and titanium is excellent for two reasons; first, the perfect solid solubility between the two metals creates a strong bond and, second, because of this perfect solid solubility and the absence of an intermetallic compound, the bond is ductile. On the other hand, there is negligible diffusion of the zirconium surface into its mating surface aluminum. Therefore, the interface between the zirconium B and the mating surface aluminum C will be free of alloying conditions and, as a result, solid bonding does not occur. Other mating surface combinations may be used. Mating surfaces which have less than one tenth of one percent solid solubility into each other will not adhere appreciably to one another, as an example, zirconium, uranium or ruthenium material to either cobalt or stainless steel. The diffusion bonding described above may be accomplished by roll bonding, pressure bonding or coated extrusion techniques.

Figure 3:
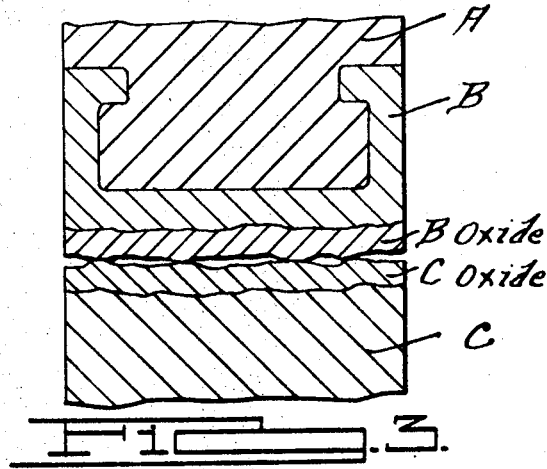

In FIG. 3, a second embodiment of the invention is shown. Material A represents the substrate to which material B is mechanically bonded. Material B may be uranium, zirconium, ruthenium or their alloys. C is the mating material. In this specific embodiment, a mechanical bond is used as a substitute for the diffusion bonding described in FIG. 2. The use of mechanical bonding means such as crimping permits the universal application of zirconium, uranium, and ruthenium to any substrate material.

Figure 4:
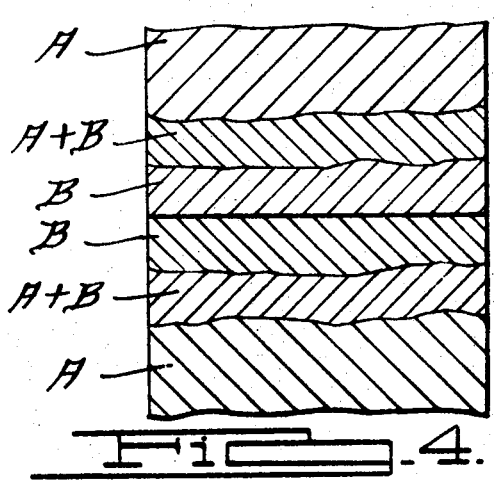

In FIG. 4, another embodiment of the invention is illustrated. Here, material B may be zirconium. Material A is a substrate material such as titanium which has diffused into the zirconium forming the alloy shown as area A+B. This embodiment has excellent application as a sliding bearing since zirconium has a low coefficient of sliding friction when mated against itself and has little tendency to gall. The zirconium surfaces are shown without an oxide layer because it is assumed that the natural oxide has been rubbed away by the sliding action. Nevertheless, the zirconium will not bond since it has a negligible rate of self diffusion without an oxide layer. Uranium against uranium or ruthenium against ruthenium can be used in an equally advantageous manner since they also have low rates of self diffusion without oxide layers. When zirconium, uranium or ruthenium is used as a surface material in a sliding bearing, it is often desirable to add gold or silver to those materials to lower their sliding coefficient of friction and to increase their ductility particularly in the case of ruthenium. Gold is preferred over silver since it has a higher temperature of vaporization, lower shear modulus and lower rate of diffusion.

Figure 5:
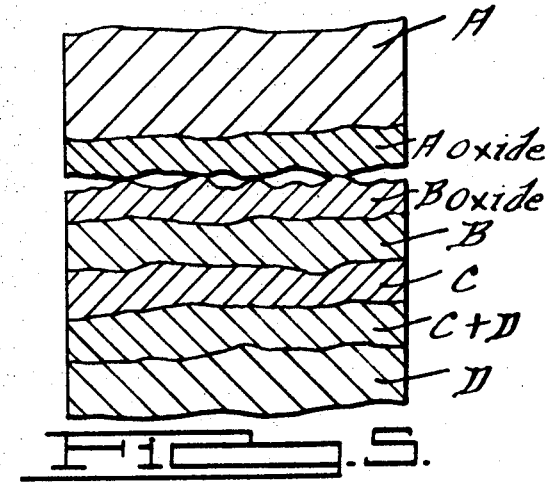

In FIG. 5, a typical use of ruthenium as a bearing surface is illustrated. In the figure, A represents a mating material such as aluminum. B represents the outer layer of ruthenium on the other mating part. Layer C is an undercoat of gold flash which has diffused into the base material D, as shown by the diffused layer, area C+D. Since ruthenium becomes brittle after work hardening, ductile undercoats such as gold are used to prevent cracking of the ruthenium coating. Chemical decomposition of the ruthenium compound appears to be the best method to bond ruthenium or its alloys to a substrate. Ruthenium exhibits a work hardening characteristic thereby becoming stronger under repeated loads. Due to its work hardening characteristics, ruthenium may be used to great advantage under high stress conditions such as those occurring where there is a small contact area between the mating parts, for example, as the contact material of electrical switches. Ruthenium to be used as an electrical contact material may be alloyed with gold or silver to lower its electrical resistance.

Using zirconium, uranium and ruthenium in the methods described, combinations of mating surfaces can be constructed that will withstand a high temperature-high vacuum environment without interface adhesion. This invention has great utility in both space apparatus and conventional high vacuum equipment.

Although this invention has been disclosed and illustrated with reference to particular applications, the principles involved are susceptible of numerous other applications which will become apparent to persons skilled in the art. The invention is, therefore, to be limited only as indicated by the scope of the appended claims.

I claim:
1. An apparatus for utilization in a high vacuum environment comprising:
   a first member including a surface portion essentially consisting of uranium; and
   a second member including a surface portion mating with said first member surface portion essentially consisting of a material characterized by having a solid solubility of less than one tenth of one percent into said first member surface portion, and being further characterized in that said first member surface portion has a solid solubility of less than one tenth of one percent into said material whereby said surface portions are capable of mating in a high vacuum environment without interface adhesion due to solid state diffusion bonding.
2. The bearing of claim 1 wherein said second member surface portion essentially consists of a material selected from the group consisting of aluminum and stainless steel.
3. The bearing of claim 1 wherein said second member surface portion essentially consists of uranium.
4. The bearing of claim 1 wherein said second member surface portion essentially consists of titanium.
5. The bearing of claim 1 wherein said second member surface portion essentially consists of a material selected from the group consisting of zirconium and ruthenium.
6. The bearing of claim 1 wherein said second member surface portion includes a material selected from the group consisting of gold and silver in combination with uranium.
7. The bearing of claim 1 wherein said first member surface portion essentially consists of a material selected from the group consisting of gold and silver in combination with uranium.
8. The bearing of claim 7 wherein said second member surface portion essentially consists of a material selected from the group consisting of aluminum and stainless steel.
9. An apparatus comprising:
   a first member including a surface portion consisting of uranium; and
   a second member including a surface portion which is mating with said first member surface portion essentially consisting of a material characterized by having a solid solubility of less than one tenth of one percent into said first member surface portion, and being further characterized in that said first member surface portion has a solid solubility of less than one tenth of one percent into said material.
10. The apparatus of claim 9 wherein said second bearing member portion consists of uranium.
11. A method for preventing solid state diffusion bonding of two members to be mated in a high vacuum environment comprising the steps of:
   providing a first of said members with a surface portion essentially consisting of uranium;
   providing a second of said members with a surface portion adapted to mate with said first member surface portion essentially consisting of a material characterized by having a solid solubility of less than one tenth of one percent into said first member surface portion, and being further characterized in that said first member surface portion has a solid solubility of less than one tenth of one percent into said material.

12. The method of claim 11 wherein said second member is provided with a surface portion essentially consisting of uranium.

References Cited

UNITED STATES PATENTS

| | | | |
|---|---|---|---|
| 388,146 | 8/1888 | Ostermann | 75—165 |
| 2,247,755 | 7/1941 | Hensel | 308—237UX |
| 2,696,413 | 12/1954 | Wheildon | 308—237X |
| 2,733,968 | 2/1956 | Pelz | 308—238X |
| 2,934,480 | 4/1960 | Slomin | 308—241X |
| 2,987,352 | 6/1961 | Watson | 308—241 |
| 3,071,981 | 1/1963 | Kuntzmann | 308—241X |
| 3,235,316 | 2/1966 | Whanger | 308—8.2 |
| 1,906,602 | 5/1933 | Hull | 200—144.2 |
| 1,996,304 | 4/1935 | Millikan | 200—144.2 |
| 2,024,150 | 12/1935 | Davignon | 29—199 |
| 2,195,307 | 3/1940 | Hensel | 29—199X |
| 2,241,262 | 5/1941 | Keitel | 29—199X |
| 2,242,101 | 5/1941 | Atlee | 308—241 |
| 2,300,286 | 10/1942 | Gwyn | 29—199 |
| 2,434,305 | 1/1948 | Wise | 29—194X |
| 2,600,175 | 6/1952 | Volterra | 29—199 |
| 2,622,993 | 12/1952 | McCullough | 308—241X |
| 2,627,443 | 2/1953 | Becker | 308—M |
| 2,906,008 | 9/1959 | Boegehold | 29—194 |
| 2,992,135 | 7/1961 | Finlay | 29—199X |
| 3,044,155 | 7/1962 | Robinson | 29—199X |
| 3,277,261 | 10/1966 | Pritchard | 200—144.2 |
| 3,297,552 | 1/1967 | Gisser | 29—199X |
| 3,376,082 | 4/1968 | Soder | 308—237X |

FOREIGN PATENTS

| | | | |
|---|---|---|---|
| 715,329 | 9/1954 | Great Britain | 308—241 |

MANUEL A. ANTONAKAS, Primary Examiner

U.S. Cl. X.R.

29—199; 200—144.2; 308—237, 241